UNITED STATES PATENT OFFICE.

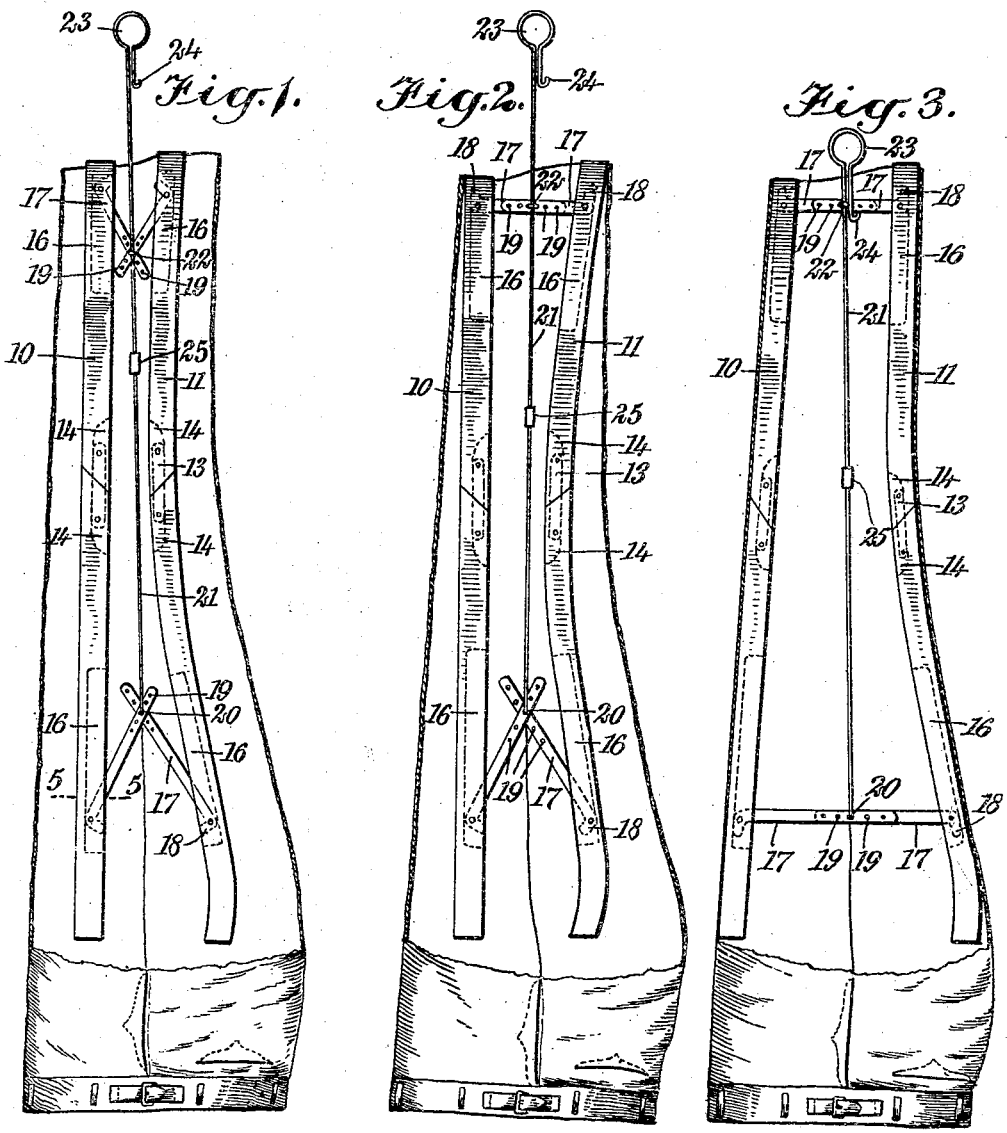

EDWARD N. HALLETT, OF CANTON, PENNSYLVANIA.

TROUSERS-STRETCHER.

939,831.　　　　Specification of Letters Patent.　　Patented Nov. 9, 1909.

Application filed January 7, 1909. Serial No. 471,106.

*To all whom it may concern:*

Be it known that I, EDWARD N. HALLETT, a citizen of the United States, and a resident of Canton, in the county of Bradford and State of Pennsylvania, have invented a new and Improved Trousers-Stretcher, of which the following is a full, clear, and exact description.

My invention relates to trousers stretchers, and has for its object to provide one which may be folded so that it may be packed for the convenience of travelers, the side bars having recesses in which the stretcher members are pivoted, a central rod being provided, which has means by which it is adapted for operating the stretcher members, which have means for limiting their movement away from the side bars.

Still other objects of the invention will appear in the following complete description.

In this specification I will describe the preferred form of my invention, but it will be understood that I do not limit myself thereto, as I consider myself entitled to all forms and embodiments of the invention which may be held to fall within the scope of the appended claims.

Reference is to be had to the accompanying drawings, forming a part of this specification, in which similar characters of reference indicate corresponding parts in all the figures, in which—

Figure 1 is a side elevation of the invention showing the trousers leg broken away and in section; Fig. 2 is a similar view with the upper stretcher members disposed substantially at right-angles to the side bars; Fig. 3 is a similar view showing not only the upper but also the lower stretcher members disposed substantially at right-angles to the side bars; Fig. 4 is a view of one of the side bars in a folded position; and Fig. 5 is a sectional view on the line 5—5 of Fig. 1, with the stretcher disposed in the recess in the side bar.

By referring to the drawings, it will be seen that side bars 10 and 11 are provided, the side bar 10 being substantially straight, to be disposed along the front of the trousers leg and the side bar 11 being curved, to be disposed along the rear of the trousers leg. Each of the side bars has a pointed outer edge 12, which is adapted to press against the inner side of the trousers leg, in the crease, to keep the trousers in shape.

In order to construct the trousers stretcher, so that it may be easily folded for shipment, I construct each of the side bars in two sections, which are joined by links 13, pivoted in recesses 14 in adjoining edges of the side bars, the adjoining edges 15 being cut obliquely, and the links 13 being so secured that frictional contact between the adjoining edges will hold the sections of the side bars in position when they are extended. In longitudinal recesses 16, which are disposed near the upper terminals of the side bars and near their lower terminals respectively, are pivoted stretcher members 17, the two stretcher members 17 being disposed preferably in each of the side bars 10 and 11. The upper stretcher members are pivoted near the upper ends of the upper recesses 16 and the lower pair of stretcher members 17 are pivoted near the lower ends of the lower set of recesses 16. Each of the stretcher members 17 has an elbow 18 disposed substantially at right-angles to the stretcher member at its inner terminal, the elbows 18 on the lower set of stretcher members 17 being disposed downwardly and the elbows 18 on the upper set of stretcher members 17 being disposed upwardly, the elbows 18 being adapted to lie against the inner faces of the recesses 16 when the stretcher members 17 are outwardly disposed from the side bars. In the outer terminals of each of the stretcher members 17 there are a plurality of orifices 19, the stretcher members in each set being adapted to lap each other, so that one of the orifices 19 in one of the stretcher members 17 will be in alinement with an orifice 19 in the other and opposite stretcher member 17. In alining orifices 19 in the lower set of stretcher members 17, is disposed the bent terminal 20 on an operating rod 21, said terminal forming a pivot for the lower set of stretcher members 17. A pivot having an eye 22 is disposed in the orifices 19 in the upper set of stretcher members 17, said stretcher members lapping each other to permit the pivot to be inserted in the orifices. Through the eye 22 the operating rod 21 is disposed, said rod being curved annularly at its upper end 23, the terminal 24 being in the shape of a hook, which is adapted to engage the upper set of stretcher members 17, as best shown in Fig. 3.

In using my invention, the operating rod 21 is removed, so that the stretcher members 17 may be adjusted to fit the leg of the trousers which are to be stretched. When the adjustment has been ascertained, the lower terminal of the operating rod 21 is disposed in the orifices 19 in the lower stretcher members 17, which will produce the desired movement of the side bars 10 and 11, and the pivot having the eye 22 is then disposed in the orifices 19 in the upper set of stretcher members 17, which will produce the desired movement of the side bars 10 and 11. The operating rod, which is disposed in the eye 22, is in position for operation and when the stretcher is disposed in the trousers leg, by pushing the operating rod 21 downwardly the lower stretcher members 17 will be moved to a position substantially at right-angles to the side bars 10 and 11, in which position they will be held, as the elbows 18 will prevent them from moving farther downward. The upper stretcher members 17 are then drawn upwardly, so that they may be engaged by the hook 24 on the operating rod 21, and in this position the side bars 10 and 11 are held outwardly against the inner sides of the trousers leg, the pointed edges 12 of the side bars being held in the creases. When desired the trousers stretcher may be inserted in the leg and the upper set of stretcher members 17 be drawn to a position substantially at right-angles to the side bars 10 and 11, after which, by pushing the operating rod 21 downwardly, the lower stretcher member 17 may be moved to a position substantially at right-angles to the side bars, when the hook 24 may be adjusted on the upper stretcher members 17. When my trousers stretcher has been adjusted to a particular pair of trousers, it will not have to be readjusted, as the parts will assume the same position every time the trousers stretcher is used for that particular pair of trousers. The operating rod is preferably constructed in sections, which are joined together by a union member 25.

Having thus described my invention, I claim as new and desire to secure by Letters Patent:

1. In a trousers stretcher, oppositely disposed side bars, two pairs of stretcher members pivoted to said side bars, an operating rod, pivots connecting the pairs of stretcher members respectively, one of the pivots being secured to the rod near one of its terminals, and the other pivot having a sliding engagement with the rod, means in connection with one pair of stretcher members and the side bars for limiting the movement of said pair of stretcher members to a predetermined extended position from the side bars respectively, the rod being looped to form an eye, by which it may be hung up, the other terminal of the rod having a hook which engages the stretcher members which are connected by the pivot, with which the rod has a sliding engagement.

2. In a trousers stretcher, oppositely disposed, divided side bars, the abutting ends of which are cut obliquely respectively, there being recesses in the adjoining ends of the side bars respectively, links pivoted in the recesses, by which the side bars are united respectively, two pairs of stretcher members pivoted to the side bars, an operating rod, pivots connecting the pairs of stretcher members respectively, one of the pivots being secured to the operating rod near one of its terminals, and the other pivot having a sliding engagement with the operating rod, means for limiting the movement of one pair of pivoted stretcher members to a predetermined position relatively to said side bars respectively, the rod being looped to form an eye, by which it may be hung up, the other terminal of the rod having a hook which engages the stretcher members which are connected by the pivot, with which the rod has a sliding engagement.

3. In a trousers stretcher, oppositely disposed side bars, two pairs of stretcher members pivoted to said side bars, an operating rod, pivots connecting the pairs of stretcher members respectively, one of the pivots being secured to the rod near one of its terminals, and the other pivot having a sliding engagement with the rod, and means in connection with the stretcher members and the side bars for limiting the movement of the upper stretcher members upwardly and the lower stretcher members downwardly, the rod being looped to form an eye by which it may be hung up, the other terminal of the rod having a hook which engages the stretcher members which are connected by the pivot with which the rod has a sliding engagement.

In testimony whereof I have signed my name to this specification in the presence of two subscribing witnesses.

EDWARD N. HALLETT.

Witnesses:
   EDWARD W. HALLETT,
   CHARLES A. STINSON.